United States Patent [19]
Hansen

[11] Patent Number: 5,898,887
[45] Date of Patent: Apr. 27, 1999

[54] RECEIVER UNIT FOR A DATA TRANSMISSION SYSTEM

[75] Inventor: Bent Hansen, Værløse, Denmark

[73] Assignee: DSC Communications A/S, Ballerup, Denmark

[21] Appl. No.: 08/753,446

[22] Filed: Nov. 25, 1996

[30] Foreign Application Priority Data

Nov. 24, 1995 [DK] Denmark .................................. 1331/95

[51] Int. Cl.⁶ ............................. G06F 13/12; G06F 13/14
[52] U.S. Cl. ......................... 395/821; 395/292; 370/394; 370/389; 370/392
[58] Field of Search ............................. 364/200; 395/872, 395/575, 292, 821; 370/94.1, 394, 389, 392

[56] References Cited

U.S. PATENT DOCUMENTS

| | | | |
|---|---|---|---|
| 4,208,714 | 6/1980 | Eklund et al. ........................... | 364/200 |
| 5,045,997 | 9/1991 | Watanabe ................................. | 364/200 |
| 5,202,980 | 4/1993 | Morita et al. ........................... | 395/575 |
| 5,249,271 | 9/1993 | Hopkinson et al. ..................... | 395/250 |
| 5,263,024 | 11/1993 | Kumaki et al. ......................... | 370/94.1 |

FOREIGN PATENT DOCUMENTS

| | | | |
|---|---|---|---|
| 0573861 | 12/1993 | European Pat. Off. ........... | H04J 3/16 |
| 0641099 | 3/1995 | European Pat. Off. ........... | H04J 3/16 |
| 4218207 | 12/1993 | Germany ........................ | H04L 12/52 |
| 9322852 | 11/1993 | WIPO ............................... | H04J 3/06 |

*Primary Examiner*—Curtis A. Kuntz
*Assistant Examiner*—Hassen Ahmed Mia
*Attorney, Agent, or Firm*—Baker & Botts, L.L.P.

[57] ABSTRACT

A receiver unit for a data transmission system, where transmitted data signals are accompanied by overhead signals, comprises processor means with one or more processors for processing said overhead signals as well as RAM type storage means, in which the processor means can store the data which are obtained by the processing of the overhead signals. Further, between the arriving overhead signals and the processor means there is a buffer circuit, in which the overhead signals can be temporarily placed prior to their processing, and from which the processor means can fetch the signals as the processor means become ready to process the signals.

9 Claims, 3 Drawing Sheets

RECEIVER UNIT FOR A DATA TRANSMISSION SYSTEM

TECHNICAL FIELD OF THE INVENTION

The invention concerns a receiver unit for a data transmission system where transmitted data signals are accompanied by overhead signals, and where the receiver unit comprises processor means with one or more processors to process said overhead signals as well as RAM type storage means, in which the processor means can store the data obtained by the processing of the overhead signals.

RELATED PATENT APPLICATION

This application claims the benefit of Danish Patent Application Serial No. 1331/95, filed on November 24, 1995.

BACKGROUND OF THE INVENTION

When data are transmitted from one point to another, the data proper will be accompanied by so-called overhead information which is used for controlling and administering the entire transmission system. The overhead information in each data frame consists of a plurality of bits or bytes, each of which has a specific meaning and has a specific designation (e.g. V5, J2 or N2) in the data structure concerned.

This overhead information is to be processed in a receiver (which may be part of a regenerator or a multiplexer) receiving the transmitted data, and each of the said bits or bytes is to be interpreted separately, and the result is used in accordance with the function of the bit or byte concerned.

Typically, in a receiver a very large number of different overhead bits is to be processed in this manner, and moreover the receiver frequently receives a large number of channels in parallel, each of which contains overhead information of the same type, i.e. e.g. a J2 byte for each channel. Even the overhead bytes which do not arrive in parallel, frequently arrive so rapidly after each other that a single processor cannot manage to process one overhead byte before the next one arrives. Since, as mentioned, the overhead signals are to be processed and interpreted separately, one processor per channel and per overhead type must be available in principle. Of course, this results in a very large number of processors.

Since these processors will operate independently of each other in principle, it will moreover be very difficult to coordinate their use of a common RAM storage, as it causes problems when several processors simultaneously try to get access to the RAM storage. Consequently, each processor must have its own RAM storage, which, of course, takes up much space on the chip in which the circuit is implemented. This is a problem particularly when the circuit is implemented on a customer-designed ASIC circuit where space is exceptionally precious. The design tools used when designing such ASIC circuits will always try to locate e.g. a RAM storage as close as possible to the associated processor to avoid much and long wiring, and the many RAM storages will therefore take up much space precisely where space is most precious. Precisely the extensive wiring makes it moreover impossible to move the many RAM storages outside the circuit.

In case of a terminal multiplexer, a corresponding number of overhead information will additionally have to be generated and transmitted, thereby doubling the number of processors and RAM storages.

SUMMARY OF THE INVENTION

The invention permits the use of a common processor to handle all or at any rate most of the overhead signals. When a common processor is used, the many RAM storages may also be combined to a single, common RAM storage, and this may moreover be located externally, since the wiring has now been greatly reduced.

This is achieved according to the invention in that the arriving overhead signals and the processor means have interposed between them a buffer circuit in which the overhead signals may temporarily be placed prior to their processing, and from which the processor means may fetch the signals as the processor means become ready to process the signals.

When the overhead signals are first stored temporarily in the buffer circuit, following which the processor means can fetch them and process them serially, irrespective of their time of arrival, it will be possible for a single or a few processors to be able to process all the overhead signals in time, as long as it is sufficiently rapid to be able to process them all on average. Thus, all overhead types from each channel in an SDH system must in principle be capable of being processed within the 125 $\mu$sec. which are the duration of an STM-1 frame, except that some signals just arrive in every fourth frame.

Other embodiments of the invention include the use of a single processor and a single RAM storage, respectively, wherein the latter may be located outside the integrated circuit in which the processor is arranged.

When, moreover, the buffer circuit has indicator signals indicating when new overhead signals are received, it will be easier for the processor to determine the order in which it will process them. This is additionally facilitated by means of a priority circuit.

In some cases there may be overhead signals which have to processed at once, and which cannot therefore wait to be included in the processing order of the processor. This may apply to certain items of information on pointer adjustments which are to be used at once when desynchronizing the received data signals. These selected overhead signals may then be fed directly to separate processor means. These processors may have their own RAM storages, which, since they may be relatively small, may optionally be arranged on the integrated circuit where also the processor means are arranged.

When the circuit is used in connection with terminal multiplexers, overhead information is to be received as well as transmitted and, therefore, the buffer circuit may be adapted to handle overhead signals both to and away from the processor means, as these may then also generate the overhead signals to be transmitted from the unit.

BRIEF DESCRIPTION OF THE DRAWINGS

The invention will be explained more fully below with reference to the drawing, in which.

DETAILED DESCRIPTION OF THE INVENTION

A Synchronous Digital Hierarchy (SDH) is a digital transmission system which may be used e.g. in connection with the transfer of a large number of telephone channels between nodes in a telecommunications network.

Figure 1:
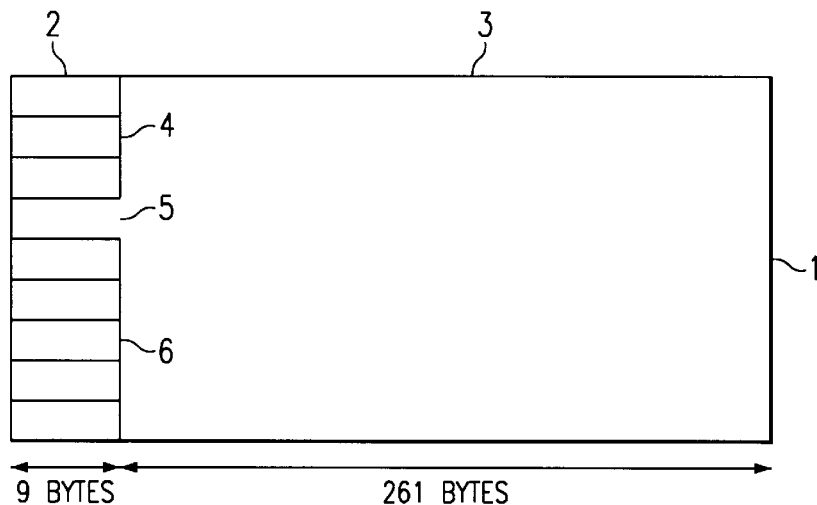
FIG. 1 shows how an STM-1 frame in an SDH system is designed.

Like many other signals transmitted in telecommunications networks, SDH signals are a serial flow of logic 1's and 0's that may be divided into a sequence of bytes of 8 bits each. The signals are structured such that the transmitted bit flow may be subdivided into a plurality of channels for different applications. The basic structure of an SDH signal is a so-called Synchronous Transport Module at level 1 (STM-1), which is shown in FIG. 1 from which it appears that the STM-1 signal may be illustrated as a frame 1 having 9 rows and 270 bytes in each row. The signals are transmitted one row at a time with the uppermost row first, and each row is transmitted from the left to the right. Each byte is transmitted with most significant bit first.

As appears from the FIG. 1, the first 9 overhead bytes 2 are used in each row of the SDH system itself for overhead 4, 6 and pointers 5, respectively. The remaining 261 payload bytes 3 in each row constitute the transport capacity of the SDH system, with part thereof also being used for overhead. The STM-1 frame is transmitted 8000 times per second, corresponding to a duration of 125 $\mu$s of each frame, and since each frame contains 9 rows each having 270 bytes of 8 bits each, the data rate is thus 155.520 Mbits/s. The 125 $\mu$sec. corresponds to the sampling time in a digital telephone channel. A telephone channel is digitized with 8 bits, and this means that each byte in an STM-1 signal may be a telephone channel.

The transport capacity of the 9 rows of 261 bytes each constitutes a so-called virtual container, which is called VC-4. Frequently, the SDH system is used for transporting e.g. PDH signals, and in that case a VC-4 may contain a PDH channel of 140 Mbits/s, or it may be subdivided into a plurality of smaller virtual containers. It may contain 3 VC-3 each having a PDH channel of 34 Mbits/s or 63 VC-12 each having a PDH channel of 2 Mbits/s. An insertion structure, a so-called mapping, is defined for each of these signal types, said mapping indicating how the signal is to fill the allocated location in the frame.

Figure 2:
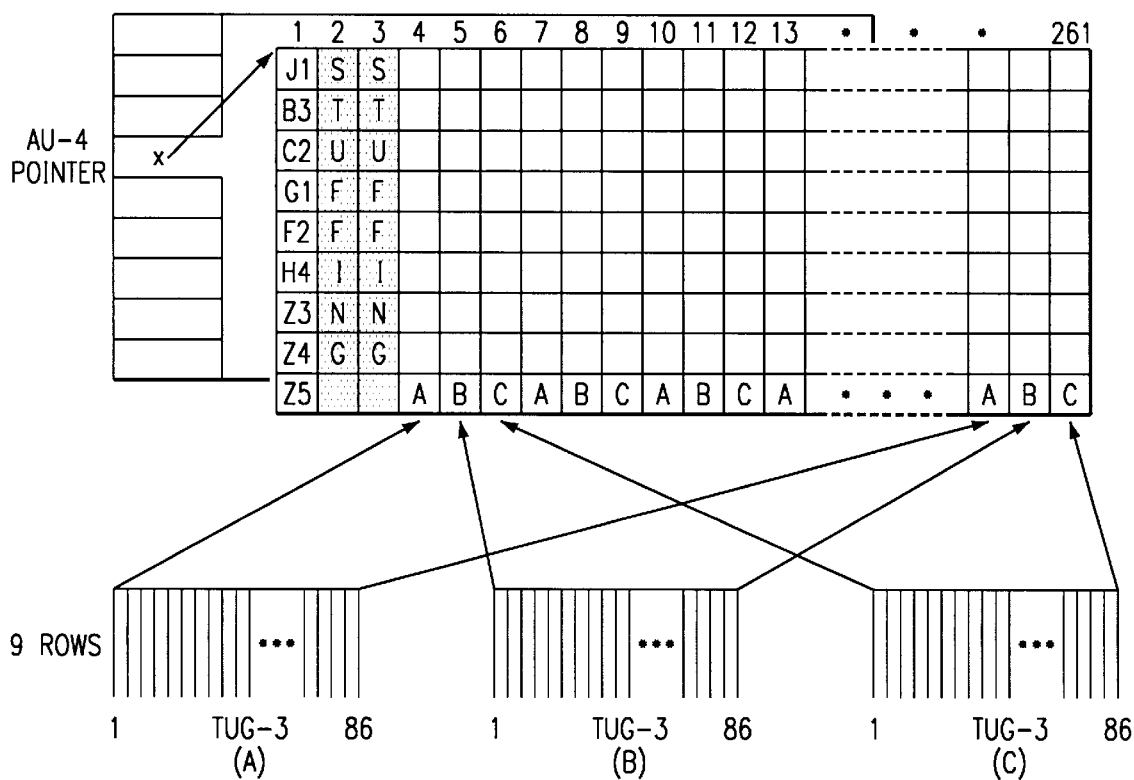
FIG. 2 shows how 3 TUG's are multiplexed into a VC-4.

FIG. 2 thus shows how the 3 VC-3 containers may be mapped into a VC-4. This i's-'done in that VC-4 is subdivided into 3 units called TUG-3, each of which can contain a VC-3. As will be seen, the first three columns are used for overhead and filling bytes, while the three TUG-3 units are multiplexed in the remaining columns.

Figure 3:
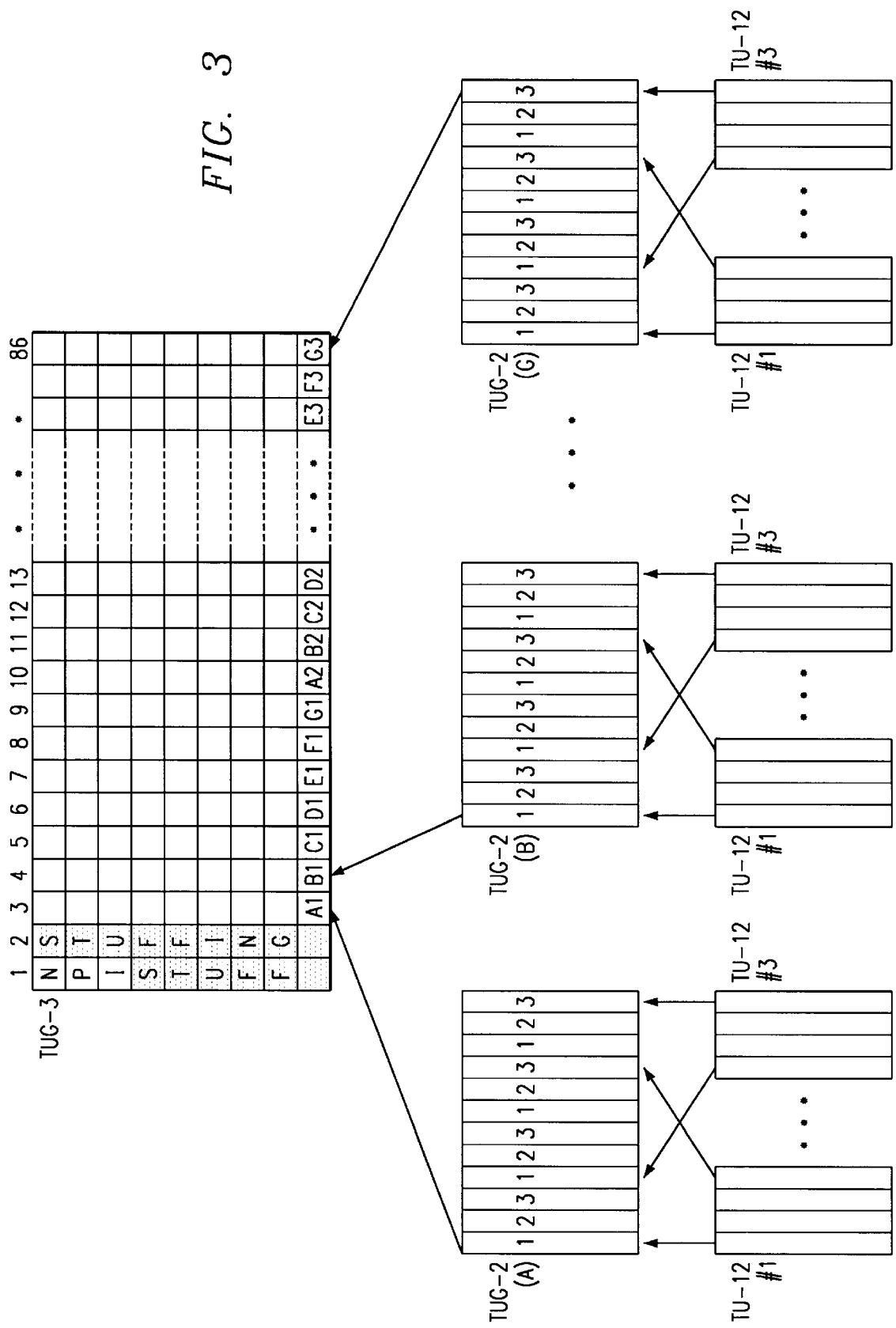
FIG. 3 shows how TU-12's and TUG-2's are multiplexed into a TUG-3.

If 2Mbits/s channels are to be transferred, each TUG-3, instead of a VC-3, contains 7 TUG-2 units, each of which is in turn divided into 3 TU-12 units. FIG. 3 shows how the TU-12's and the TUG-2's are multiplexed in TUG-3. It also appears that each TU-12 consists of 4 columns each having 9 bytes in each SDH frame, i.e. a total of 36 bytes for each 125 $\mu$s.

Figure 4:
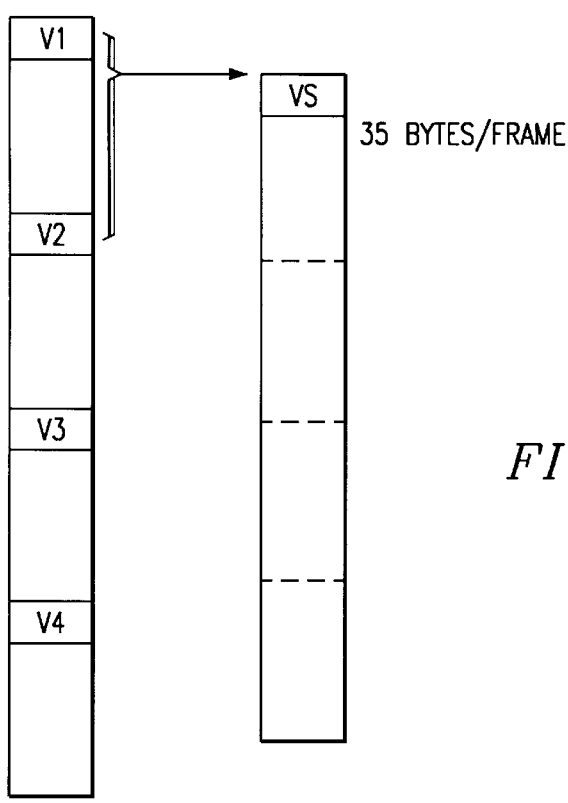
FIG. 4 shows the linkage of VC-12's from 4 successive VC4's.

In principle, a VC-12 might thus be included in each Th-12; but to utilize the space better for overhead information, the TU-121s (i.e. 36 bytes) are linked in 4 successive VC-4 containers in practice. Hereby, each byte intended for overhead can be used for various items of overhead information, but, then, each of these is transferred only in every fourth VC-4. This linkage is shown in FIG. 4.

Figure 5:
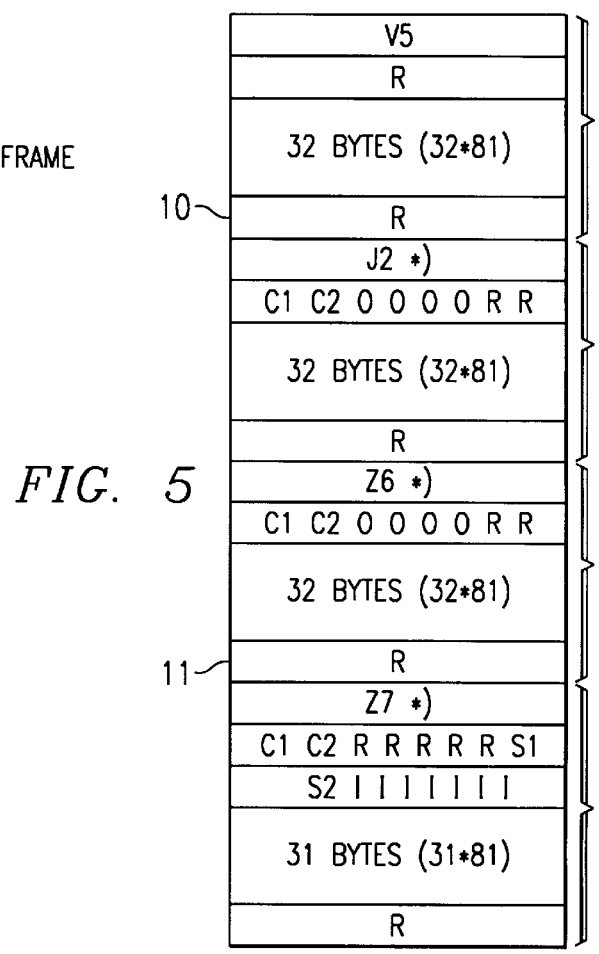
FIG. 5 shows the structure of FIG. 4 in greater detail.

FIG. 5 show this structure in greater detail. I represents the bits which are used for the information proper, i.e. the telephone channels. R designates bits which are inserted to make the bit number come right when the 2 Mbits/s channel is mapped into the VC-12. These bits—are called stuffing bits. If a whole byte exclusively consisted of stuffing bits, then the byte may be referred to as a stuffing byte.

The other designations are various items of overhead information, and it is these that are relevant in connection with the invention, which relates to the processing of such overhead information in a receiver circuit. The figure shows overhead bytes with the designations V5, J2, Z6 and Z7 as well as bytes where just some bits contain overhead information. As mentioned above, precisely this overhead information will just be transferred in every fourth VC-4, i.e. for each 500 $\mu$sec., while other overhead signals will be transferred each time, i.e. for every 125 psec.

Figure 6:
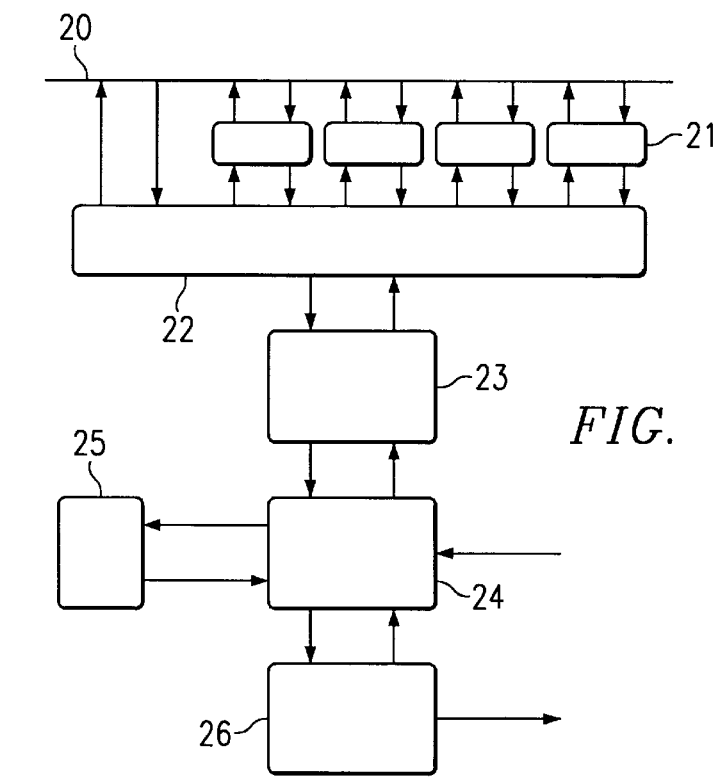
FIG. 6 shows the structure of a circuit according to the invention.

It is shown in FIG. 6 how a circuit may be designed according to the invention. At the top, the figure shows the section 20 from which the signals are received or to which they are transmitted. The buffer circuits 21 communicate with the section 20 via arrows in both direction, it being possible to receive as well as to transmit overhead signals. A priority circuit 22 current scans the buffer circuits to check whether new overhead information has arrived, which may then be passed on to the processor 23. Also the connections between the buffers 21 and the priority circuit 22 are bidirectional for information to be handled in both directions. Therefore a 4-port RAM may be used as a buffer circuit, as there must be two inputs and two outputs. When the buffer circuits receive a new overhead byte, an indication bit will be set at its location to indicate that information is now ready to be fetched. The next time the priority circuit 22 in its priority search encounters an indication bit which is set, it can transmit the information to the processor, if the processor is ready, and then again reset the indication bit.

It should be noted that since some overhead bytes are transmitted only in every fourth VC-4, as mentioned above, one and the same byte in the buffer circuits may then be used for four different types of overhead bytes in these cases.

The processor 23 communicates via the interface circuit 24 with a RAM storage 25 in which it can store its results of calculation, including intermediate results. These results, which are produced by the processing of the overhead signals, may then be used for controlling various processes in the receiver circuit via the control circuit, depending upon the importance of the individual overhead byte.

Since the circuit may also be used in a terminal multiplexer, in which overhead information is to be both received and transmitted, the entire circuit is basically bidirectional. Thus, by means of data in the RAM storage, the processor 23 can calculate overhead bytes which are placed in the buffers 21 via the priority circuit 22, and then they are ready to be transmitted at the right time with respect to the SDH system.

It is the buffers 21 together with the priority circuit 22 that enable a single processor 23 to handle all the overhead signals in time, many of which possibly arrive at the same time or very closed spaced. It should be noted in this connection that the section 20 may be connected to several SDH channels, which means that several overhead bytes of the same type may arrive simultaneously, and without the buffer circuit 21 it would therefore be impossible for a single processor to handle them all.

Although a preferred embodiment of the present invention has been described and illustrated, the invention is not restricted to this, but may be embodied in other ways within the scope of the subject-matter defined in the following claims.

What is claimed is:

1. A receiver unit for a data transmission system, where transmitted data signals are accompanied by overhead signals, and where the receiver unit comprises processor means with one or more processors to process said overhead signals RAM storage means in which the processor means may store the data obtained by the processing of the overhead signals, characterized in that the arriving overhead signals and the processor means have interposed between them a plurality of buffer circuits in which the overhead signals may temporarily be placed prior to their processing, and from which the processor means may fetch the overhead signals from the buffer circuits according to a desired processing priority as the processor means becomes ready to process the overhead signals.

2. A receiver unit according to claim 1, characterized in that said RAM storage means are formed by a single RAM storage which is common to said processor means.

3. A receiver unit according to claim 1, characterized in that the processor means are placed on an integrated circuit, and that said RAM storage means are arranged outside the integrated circuit.

4. A receiver unit according to claim 1, characterized in that the processor means are formed by a single processor.

5. A receiver unit for a data transmission system, where transmitted data signals are accompanied by overhead signals, and where the receiver unit comprises processor means with one or more processors to process said overhead signals and RAM storage means in which the processor means may store the data obtained by the processing of the overhead signals, characterized in that the arriving overhead signals and the processor means have interposed between them a plurality of buffer circuits in which the overhead signals may temporarily be placed prior to their processing, and from which the processor means may fetch the overhead signals as the processor means becomes ready to process the overhead signals, characterized in that each buffer circuit for receiving the overhead signals, which it can temporarily store, moreover has an indicator signal capable of indicating that the buffer circuit has received an overhead signal which has not yet been fetched by the processor means.

6. A receiver unit according to claim 5, characterized by moreover comprising a priority circuit adapted to scan the indicator signals of the buffer circuits for information on received overhead signals in a predetermined order of priority, and, when a received, but not fetched overhead signal has been detected, to transfer it to the processor means for processing.

7. A receiver unit for a data transmission system, where transmitted data signals are accompanied by overhead signals, and where the receiver unit comprises processor means with one or more processors to process said overhead signals and RAM type storage means in which the processor means may store the data obtained by the processing of the overhead signals, characterized in that the arriving overhead signals and the processor means have interposed between them a plurality of buffer circuits in which the overhead signals may temporarily be placed prior to their processing, and from which the processor means may fetch the overhead signals as the processor means becomes ready to process the overhead signals, characterized by moreover comprising other processor means adapted to process certain selected overhead signals, and means capable of transferring said selected overhead signals directly to said other processor means without going through the buffer circuits immediately when they are received by the receiver unit.

8. A receiver unit according to claim 7, characterized in that the said other processor means have associated RAM storages placed on the same integrated circuit as the said other processor means.

9. A receiver unit according to claim 1, where the unit moreover comprises transmitter means, characterized in that the buffer circuits are moreover adapted to receive overhead signals from the processor means in an order determined by the processor means and to store the overhead signals temporarily with a view to subsequent transmission from the unit in another predetermined order.

* * * * *